United States Patent [19]

Rayfield

[11] 4,166,402
[45] Sep. 4, 1979

[54] INDEXING ROTARY ACTUATOR WITH ENERGY STORAGE AND LINKAGE LOCKING MEANS

[75] Inventor: Wilson P. Rayfield, Pittsford, N.Y.

[73] Assignee: Burroughs Corporation, Detroit, Mich.

[21] Appl. No.: 844,480

[22] Filed: Oct. 21, 1977

[51] Int. Cl.² .............................. B23Q 17/00
[52] U.S. Cl. .................. 74/822; 74/813 L; 74/817
[58] Field of Search ............ 74/813 C, 813 L, 816, 74/817, 142, 822

[56] References Cited

U.S. PATENT DOCUMENTS 3,473,207  10/1969  George ........................... 74/816

FOREIGN PATENT DOCUMENTS 749846  6/1956  United Kingdom ............... 74/813 L Primary Examiner—Benjamin W. Wyche
Assistant Examiner—D. C. Reichard
Attorney, Agent, or Firm—Gerald J. Woloson; Robert J. Gaybrick; Edward J. Feeney, Jr.

[57] ABSTRACT

An indexing rotary actuator for applying the torque of a rotatable pivot arm to rotate a member between plural index positions. The forward stroke of the pivot arm drives a slider crank linkage through a four bar linkage to unlock the rotatable member and rotate the member to its next index position. On the return stroke of the pivot arm a spring biased locking arm on the rotatable member is interlocked with the actuator to lock the rotatable member in the index position. Interlock switches are provided to indicate when a rotated member is in a valid index position.

8 Claims, 5 Drawing Figures

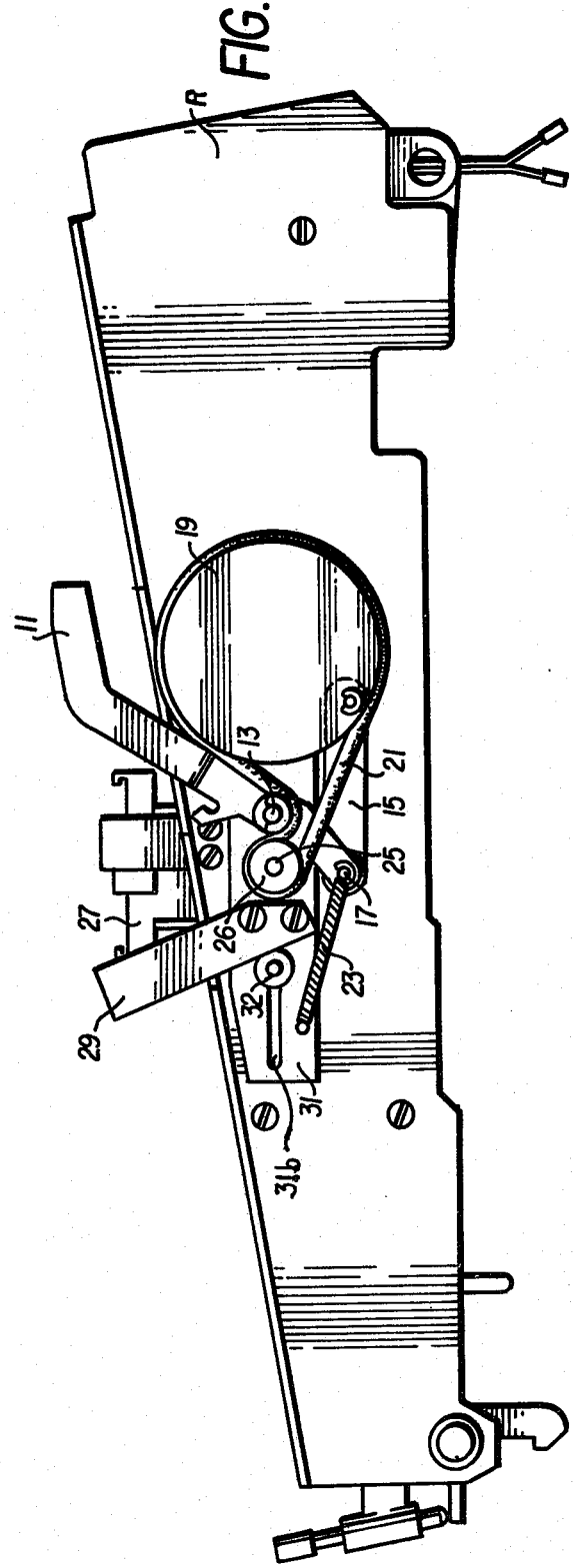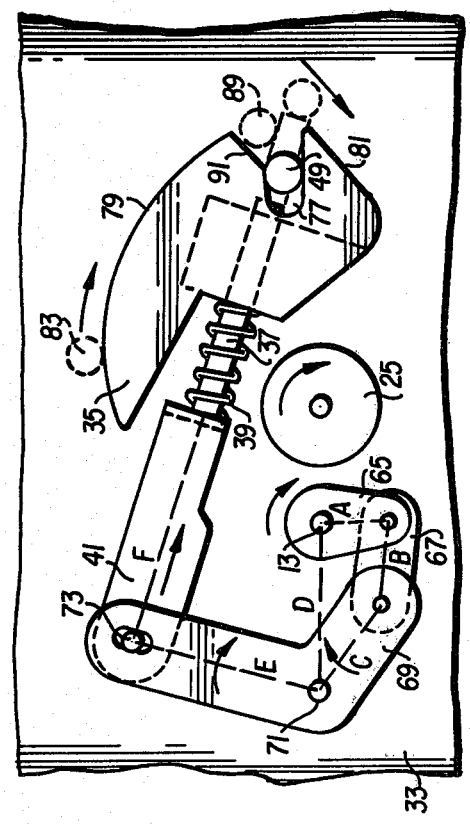

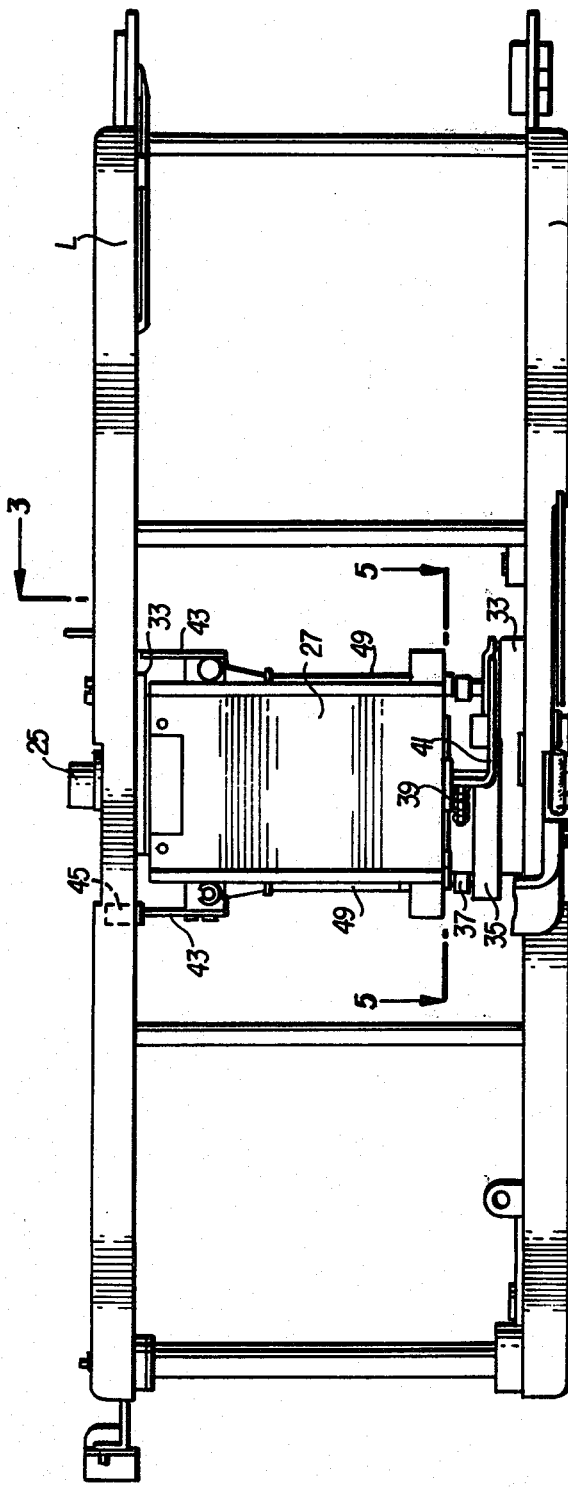
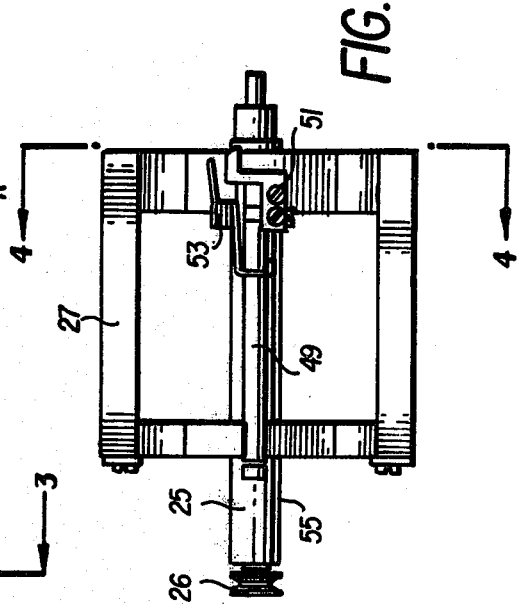
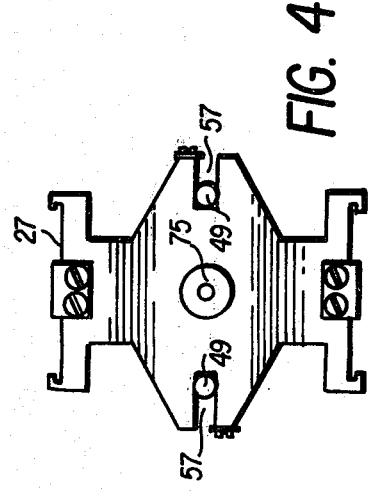

INDEXING ROTARY ACTUATOR WITH ENERGY STORAGE AND LINKAGE LOCKING MEANS

FIELD OF THE INVENTION

The invention relates with particularity to a rotary actuator which in a single movement unlatches a rotatable member, rotates the rotatable member and relatches the rotatable member.

BACKGROUND OF THE INVENTION

There have been many prior art actuators for rotatably indexing a rotatable member between plural locked positions. These prior art devices have primarily required multiple steps and mechanisms to unlock the rotatable member; rotate the rotatable member to an index position; and finally to relock the rotatable member in its new position. These devices, therefore, required the use of two hands by the operator because it is necessary to manipulate a locking mechanism as well as a rotating mechanism. Also, many of the prior art devices were cumbersome to use and because of their bulk were not usable in certain situations where a compact device was necessary. Many of the prior art actuators required multiple complicated mechanisms which were subject to failure and were unable to consistently and accurately rotate the member into an index position.

SUMMARY OF THE INVENTION

It is an object of this invention to provide an indexing rotary actuator for rotating a rotatable member between plural index positions.

It is another object of this invention to provide an indexing rotary actuator which in a single back and forth stroke of a pivot arm unlatches a rotatable member from a locked position, rotates the rotatable member to the next index position and relatches the rotatable member in a locked position.

It is a further object of this invention to provide an indexing rotary actuator which is mounted on sliding blocks such that the entire actuating mechanism is slidable between supporting side plates.

It is yet another object of this invention to provide an indexing rotary actuator which rotates a rotatable member in one direction between plural index positions and prevents the reverse rotation of the rotatable member.

It is still another object of this invention to provide an indexing rotary actuator which employs a continuous flexible belt which in the initial portion of the forward stroke functions as an energy storage device and subsequently releases the stored energy to rotate the rotatable member after the rotatable member has been unlatched from its locked position.

Still another object of this invention is to provide an indexing rotary actuator which rotates a rotatable member between a plurality of locked positions.

It is still another object of this invention to provide an indexing rotary actuator which includes means for preventing a rotatable member from rotating past an index position.

These and other objects are accomplished by an indexing rotary actuator which stores in an elongated flexible belt the torque generated by the forward stroke of a pivot arm. The torque is applied to rotate a rotatable member after the stroke of the pivot arm unlatches the rotatable member from the locked position. After the rotatable member has been rotated to its next index position the pivot arm is returned to its rest position which results in a relatching of the rotatable member in a locked position. Interlock sensors are provided for actuation when rotatable member has been latched in an index position and the entire indexing rotary actuator is continuously positionable in a plurality of operating positions.

The novel features which are believed to be characteristic of this invention are set forth with particularity in the appended claims. The invention itself, however, both in its organization and method of operation together with further objects and advantages thereof may best be understood with reference to the following description taken in connection with the accompanying drawings.

BRIEF DESCRIPTION OF THE DRAWINGS

FIG. 1 is a side view of the indexing rotary actuator.

FIG. 2 is a top view of the indexing rotary actuator showing also a rotatable member.

FIG. 3 is a side view of the rotatable member of FIG. 2 taken along the lines 3—3.

FIG. 4 is a cross sectional view of the rotatable member of FIG. 3 taken along the lines 4—4.

FIG. 5 is a cross sectional view of FIG. 2 taken along the lines 5—5.

DESCRIPTION OF THE PREFERRED EMBODIMENT

FIG. 1 shows a side view of the indexing rotary actuator supported on side plates R and L. The pivot arm 11 is shown in its fully-clockwise rest position. Once actuated, the pivot arm 11 rotates counterclockwise about fixed pivot shaft 13 to drive link 15 through pivotal connection 17. The link 15 is driven in a direction opposite the arc traversed by the pivot arm 11 as it is actuated. The link 15 is freely mounted in pulley 19 such that actuation of the pivot arm 11 causes a partial revolution of the pulley 19. Spring 23 normally biases pivot arm 11 in the fully-clockwise, non-actuated, rest position and retracts the link 15 and pulley 19 into their initial positions. Flexible continuous belt 21 circumscribes the pulley 19 and passes around a pulley on the pivot shaft 13 and pulley member 26 on rotatable main shaft 25. The belt 21 is elastic such that as the pivot arm 11 is actuated in a counterclockwise direction, the slight stretching of the belt 21 stores the torque from the actuation of the pivot arm 11. In a manner hereinafter described the torque stored in belt 21 is frictionally applied to main shaft 25 through pulley 26 after rotatable member 27 is unlatched from a locked position. At this point, further counterclockwise actuation of the pivot arm 11 to its fully extended position causes the belt 21 to be frictionally driven during the partial rotation of pulley 19 to in a similar manner frictionally drive main shaft 25 through pulley 26. The main shaft 25 serves as the axle for rotation of rotatable member 27. Roll bar 29 is secured to right outside slider 31 to shield the rotatable member 27 as it rotates about main shaft 25. The entire indexing rotary actuator as shown in FIG. 1 slides on slider member 31 relative to the side plate R. The slider member 31 contains an elongated horizontal slot 31b which slides horizontally on pin 32 such that the indexing rotary actuator can be horizontally positioned on the side plate R.

FIG. 2 is a top view of the indexing rotary actuator shown in FIG. 1. As seen in FIG. 2 the rotatable member 27 is supported by the indexing rotary actuator between left and right side plates L and R. The main shaft 25 runs between the left and right side plates and through the rotatable member 27. The rotatable member 27 and the indexing rotary actuator are mounted on interior sliders 33 which are displaceable along the left and right side plates such that the rotatable member 27 is also variably positionable. Guide block 35 is mounted on the right slider 33 as are the other elements of the linkage of the indexing rotary actuator which are employed to move unlatching pin 37 through an aperture in guide block 35 under the influence of link 41 and in opposition to spring 39. The pin 37 is employed to unlatch the rotatable member to permit the indexing rotary actuator to rotate the rotatable member into its next index position.

The rotatable member and indexing rotary actuator can include an interlock switch which is actuated when the rotatable member has been rotated into an index position. The switch comprises a switch arm 43 which is attached to the rotatable member 27 and trips plunger switch 45 when the rotatable member 27 is in an index position. The plunger switch 45 can be employed to supply interlock signals to a control circuit which is not shown and is not part of the invention.

FIG. 3 is a cross-sectional view of the indexing rotary actuator FIG. 2 taken along the lines 3—3. In FIG. 3 the rotatable member 27 is shown mounted on the main shaft 25. The pulley 26 which is the guide for the continuous flexible belt 21 is shown on the end of the main shaft 25. In the embodiment shown in FIGS. 2-4 the rotatable member is a platen holding device which can be employed to hold printing plates and to function as a print head within a document printer. The function of the rotatable member 27 is not the subject of the instant invention since the indexing rotary actuator can be employed in many applications to rotate many and various rotatable members.

The rotatable member 27 includes a locking arm 49 which is mounted at 51 to the rotatable member and is biased toward the main shaft 25 by the bias spring 53. The locking arm 49 is employed to latch the rotatable member into an index position. In the instant device the rotatable member 27 includes two locking arms 49 wherein the second locking arm is provided on the opposite side of the main shaft 25 than the first locking arm and can be seen in an end view in FIG. 4. The rotatable member 27 includes a locking arm for each index position and rotatable member 27 could easily include more than two locking arms such that the angular rotation between index positions would then be less than the 180° shown in FIG. 4.

The rotatable member 27 includes a roller clutch on the main shaft 25 which is a one-way clutch and permits rotation of the shaft 25 in one direction but inhibits any rotation of the main shaft in the opposite direction. Similarly, a one-way clutch 55 is shown circumscribing main shaft 25 to insure that the main shaft 25 is only driven in one direction by the indexing rotary actuator.

FIG. 4 is a cross-sectional view of the rotatable member 27 shown in FIG. 3 taken along the lines 4—4. The main shaft 25 is shown to form the central axis of the rotatable member 27 and the latching pins 49 are shown within the pin receiving slots 57 in the rotatable member 27.

FIG. 5 shows the linkage assembly of the indexing rotary actuator and is a cross section of FIG. 2 taken along the lines 5—5. Because the cross section taken along line 5—5 is indicated as being toward side plate R, the FIG. 5 view orientation is opposite from that shown in FIG. 1. As a result, the counterclockwise movements of pivot arm 11 and of the various pulleys in FIG. 1 appear as clockwise motions in FIG. 5.

In FIG. 5, the indexing rotary actuator is shown to be mounted on the sliding block 33 such that no permanent connection is made to either of the side plates L or R. The main shaft 25 is shown centrally located within the slider block 33 and completely unconnected to the indexing rotary actuator linkage mechanism. The pivot arm shaft 13 is received in links 65 and 67 which are connected to rocker arm 69 which pivots about fixed pivot 71. The top portion of the rocker arm 69 includes a sliding pivot 73 which links the rocker arm 69 to the unlatching pin link 41. The unlatching pin 37 extends through coil spring 39 from a fixed connection on the unlatching pin link 41. The pin 37 extends through an aperture in the guide block 35 and when the indexing rotary actuator is in its non-actuated position the pin 37 is retracted within the aperture as shown by the solid lines in FIG. 5. The guide block 35 includes a locking arm receiving aperture 77 in which a locking arm 49 from the rotatable member is received when the rotatable member is positioned in an index position.

When the pivot arm 11 is actuated the linkage mechanism of the indexing rotary actuator extends the unlatching pin 37 through the aperture in the guide block 35 such that the unlatching pin 37 will push any locking arm 49 which is in the locking arm receiving aperture 77 out of the aperture against the force of the spring bias of the locking arm. In the unlocked position the unlatching pin 37 is shown extended as exemplified by the dotted lines and the locking arm 49 will reside as shown at the end of the extended unlatching pin 37. In this position the rotatable member 27 is unlocked from its index position and, as was previously described, further actuation of the pivot arm 11 will rotate the main shaft 25 in the direction indicated by the arrow in FIG. 5 such that the locking arm 81 will ride along the edge 81 of the guide block 35. In the unlatched position the rotatable member 27 is free to rotate under the influence of the indexing rotary actuator until another locking arm encounters the upper surface 79 of the guide block 35. The dotted portion 83 shows a locking arm riding along the surface 79 of the guide block 35 towards the locking arm receiving aperture 77. It can be seen as the main shaft rotates the rotatable member 27 that the locking arm will further approach the aperture 77 until it encounters the end of the upper surface 79 and rotates further to encounter the extended portion of the unlatching pin 37. This is shown by the dotted locking arm 89 shown resting against the extended unlatching pin 37. At this point the pivot arm has completed its forward stroke and the rotatable member has been rotated to its next index position. The return stroke of the pivot arm retracts the unlatching pin 37 through the indexing rotary actuator linkage such that the locking arm 89 will ride along the surface 91 of the guide block 35 and fall into the locking arm receiving aperture 77 to lock the rotatable member into its newly acquired index position. A further feature of the indexing rotary actuator can be seen by the way that the unlatching pin 37 serves as a stop for a locking arm as it approaches the locking arm receiving aperture 77 of the guide block. This prevents the locking arm and the rotatable member 27 from rotating past the index position.

Referring back to the linkage assembly of the indexing rotary actuator it can be seen that the links 65 and 67 in conjunction with the lower portion of the rocker arm 69 comprise a four bar linkage through the imaginary lines labeled A, B, C, and D. The upper portion of the rocker arm 69 taken in conjunction with the unlatching pin link 41 forms a slider crank linkage defined by the imaginary lines DEF.

The movement of the indexing rotary actuator linkage and the direction of movement of the link and pivots during the forward stroke of the pivot arm 11 have been indicated by arrows in FIG. 5. The pivot arm shaft 13 is rotated clockwise in conjunction with the forward stroke of the pivot arm 11. This results in rocker arm 69 being rocked forward about fixed pivot 71 by links 65 and 67. Forward movement of the rocker arm 69 reciprocates the unlatching pin link 41 in a forward direction compressing spring 39 and urging unlatching pin 37 through guide block 35 and into the locking pin receiving aperture 77. The unlatching pin 37 in its forward movement will push any locking arm 49 out of the aperture 77 to unlock the rotatable member and permit rotation to the next indexed position. Release of the pivot arm 11 results in spring 39 reversing the movement of the linkages to retract the unlatching pin 37 from the aperture 77 and permit a locking pin 49 to enter aperture 77 and latch the rotatable member in a locked position.

The heretofore disclosed indexing rotary actuator provides a simple and efficient means for rotating a rotatable member between plural index positions. The function and construction of the rotatable member forms no part of the instant invention. The indexing rotary actuator provides a means which by the simple actuation of a pivot arm through a forward stroke stores torque in a flexible continuous loop, unlocks the rotatable member, releases the energy stored in the loop and cooperates with the loop to rotate a rotatable member to its next index position and in its return stroke relatches the rotatable member to lock the member in an index position.

The foregoing description of a mechanical apparatus is intended to be explanatory of an indexing rotary actuator for rotating a rotatable member between a plurality of index positions. It will be understood from the foregoing that various changes may be made in the preferred embodiment illustrated herein and it is intended that the foregoing material be taken as illustrative only and not in a limiting sense. The scope of the invention is defined by the following claims.

What is claimed is:

1. An indexing rotary actuator for unlocking a rotatable member, rotating the rotatable member to an index position and locking said rotatable member in said index position, said indexing rotary actuator comprising:
   an actuatable pivot arm;
   unlocking means responsive to the actuation of said pivot arm for unlocking said rotatable member;
   means for rotating said rotatable member to an index position;
   locking means responsive to the release of said pivot arm for locking said rotatable member in said index position;
   at least one locking arm, cooperating with said locking means and said unlocking means, for locking and unlocking said rotatable member in an index position;
   a guide block;
   a locking arm receiving aperture in said guide block;
   an upper guide surface on said guide block for guiding a locking arm into said aperture;
   a lower guiding surface on said guide block for guiding a locking arm away from said aperture; and
   a channel through said guide block communicating with said aperture adapted to receive an unlatching pin.

2. The indexing rotary actuator of claim 1 wherein said unlocking means comprises:
   a rotatable pivot shaft rotated by the actuation of said pivot arm;
   unlatching pin means received in said channel and adapted to unlock said rotatable member by displacing a locking arm received in said aperture; and
   linkage means interconnecting said pivot shaft and said unlatching pin means for extending said unlatching pin means within said channel into said aperture to displace a locking arm received in said aperture and for retracting said unlatching pin means from said aperture.

3. The indexing rotary actuator of claim 2 wherein said means for rotating said rotatable member comprises:
   a rotatable main shaft for rotatably mounting said rotatable member;
   a main shaft pulley mounted on said rotatable main shaft for rotation therewith;
   a pivot shaft pulley mounted on said pivot shaft for rotation therewith;
   a rotatable transmission pulley;
   linkage means connecting said pivot arm with said transmission pulley to partially rotate said transmission pulley upon actuation of said pivot arm;
   a flexible belt circumscribing said transmission pulley, said main shaft pulley and said pivot shaft pulley, said flexible belt storing energy in the form of axial stress during the actuation of said pivot member and releasing said axial stress to rotate said rotatable main shaft upon the unlocking of said rotatable member by said unlocking means; and
   spring means for biasing said pivot shaft into a non-actuated position when said pivot arm is not actuated.

4. The indexing rotary actuator of claim 3 wherein said locking means comprises:
   locking arm spring means for biasing said locking arm into contact with said upper guide surface such that said locking arm travels along said upper guide surface toward said aperture upon rotation of said rotatable member toward an index position;
   unlatching pin biasing means for retracting said unlatching arm in said channel to permit said aperture to receive a locking arm; and
   means for biasing said pivot arm into a non-actuated position.

5. The indexing rotary actuator of claim 4 further including means for generating an interlock signal when said rotatable member is in an index position, said means comprising an interlock switch and means mounted on said rotatable member for actuating said switch when said rotatable member is in an index position.

6. The indexing rotary actuator of claim 2 wherein said linkage means comprises a four bar linkage coupled to a slider crank linkage, said four bar linkage also being coupled to said pivot shaft and said slider crank linkage also being coupled to said unlatching pin means.

7. The indexing rotary actuator of claim 3 further including stop means for preventing the rotation of said rotatable member past an index position.

8. An indexing rotary actuator for rotating a rotatable member into index positions wherein the forward stroke of a pivot arm provides torque for unlocking the rotatable member and rotating the rotatable member into an index position and the return stroke of the pivot arm results in locking the rotatable member in said index position, said actuator comprising:
   at least one displaceable locking arm on said rotatable member;
   means cooperating with said locking arm to lock said rotatable member in an index position;
   actuatable unlocking means cooperating with said last mentioned means and said locking arm for unlocking said rotatable member;
   linkage means for actuating said unlocking means during the forward stroke of said pivot arm to unlock said rotatable member;
   rotation means coupled to said pivot arm and said rotatable member for rotating said rotatable member to an index position during the forward stroke of said pivot arm after said rotatable member has been unlocked; and
   means responsive to the return stroke of the pivot arm means for locking said rotatable member in said index position.

* * * * *